US 6,736,527 B1

(12) United States Patent
Gibbon et al.

(10) Patent No.: US 6,736,527 B1
(45) Date of Patent: May 18, 2004

(54) METHOD FOR COOLING AN ARC LAMP

(75) Inventors: Michael A. Gibbon, Oakville (CA); Marian Toporkiewicz, Mississauga (CA)

(73) Assignee: Imax Corporation, Mississauga (CA)

( * ) Notice: Subject to any disclaimer, the term of this patent is extended or adjusted under 35 U.S.C. 154(b) by 0 days.

(21) Appl. No.: 09/926,247

(22) PCT Filed: Mar. 22, 2000

(86) PCT No.: PCT/CA00/00318
§ 371 (c)(1),
(2), (4) Date: Dec. 17, 2001

(87) PCT Pub. No.: WO00/60643
PCT Pub. Date: Oct. 12, 2000

(30) Foreign Application Priority Data

Mar. 31, 1999 (CA) .................................. 2267674

(51) Int. Cl.$^7$ .............................................. F21K 27/00
(52) U.S. Cl. ................. 362/264; 362/294; 362/345; 362/373; 352/57
(58) Field of Search ................. 362/263, 294, 362/350, 373, 345, 347, 264, 267; 352/57, 62

(56) References Cited

U.S. PATENT DOCUMENTS

| 3,703,635 A | 11/1972 | Burkarth | |
|---|---|---|---|
| 3,720,460 A | * 3/1973 | Wilkinson | 352/198 |
| 3,720,822 A | 3/1973 | Rochester et al. | |
| 3,843,879 A | 10/1974 | Eddy | |
| 4,290,097 A | 9/1981 | Block et al. | |
| 4,630,182 A | 12/1986 | Moroi et al. | 362/294 |
| 5,091,835 A | 2/1992 | Malek et al. | 362/294 |
| 5,369,557 A | 11/1994 | Ronney | 362/285 |
| 5,458,505 A | 10/1995 | Prager | 439/485 |
| 5,587,750 A | 12/1996 | Gibbon et al. | |
| 5,721,465 A | 2/1998 | Roberts | 313/46 |

* cited by examiner

Primary Examiner—Sandra O'Shea
Assistant Examiner—John Anthony Ward
(74) Attorney, Agent, or Firm—Bereskin & Parr

(57) ABSTRACT

A xenon arc lamp for a motion picture projector is cooled by providing the anode end of the lamp with a shroud that forms part of a support for that end of the lamp. Cooling air flows into the shroud along the support arm and enters the shroud through a slot in its side wall. The shroud provides an annular air space around the anode end of the lamp and has an annular air outlet through which the cooling air leaves as a "sheet" of laminar air flow which tends to adhere to the surface of the bulb, thereby providing precise cooling. In this way, arc instability is avoided or minimized, while lamp life is extended.

14 Claims, 4 Drawing Sheets

METHOD FOR COOLING AN ARC LAMP

FIELD OF THE INVENTION

This invention relates generally to arc lamps primarily but not exclusively for use as projection lamps in motion picture projectors.

BACKGROUND OF THE INVENTION

Xenon arc lamps generate significant heat in operation and must be cooled in order to achieve acceptable lamp life. In an air-cooled projector, the lamp is located in a lamphouse and sufficient air flow must be provided within the lamphouse to remove heat generated by the arc lamp. An example of a projector having an air cooled xenon arc lamp is disclosed in U.S. Pat. No. 5,587,750 (Gibbon, et al.). The patent does not provide specific disclosure of how the lamp is cooled but FIG. 1 of the drawings does show (at 46) a hose through which cooling air for the lamphouse (42) is exhausted from the projector. The disclosure of the Gibbon et al. patent is incorporated herein by reference.

A xenon arc lamp typically has a glass envelope enclosing an anode and a cathode between which the arc is struck. An atmosphere of inert xenon gas under pressure is provided within the envelope. The anode and cathode are located in a bulb in the glass envelope at opposite ends of respective electrode assemblies. The electrode assemblies are housed within coaxial cylindrical portions of the envelope that extend in opposite directions from the bulb. Accordingly, the lamp has a defined axis represented by the anode and cathode assemblies. In some applications, the lamp is oriented with its axis vertical (e.g. ±15°), usually with the anode uppermost. Xenon arc lamps can, however, be run in a horizontal orientation also.

DESCRIPTION OF THE PRIOR ART

The patents literature contains numerous examples of proposals for cooling lamps. A xenon arc lamp with improved reflector cooling is disclosed in U.S. Pat. No. 5,721,465 (Roberts). A searchlight incorporating a xenon arc lamp is disclosed in U.S. Pat. No. 5,369,557 (Ronney).

U.S. Pat. No. 4,630,182 (Moroi et al.) discloses a prior proposal for cooling short arc mercury lamps. Unlike xenon arc lamps, a short arc mercury lamp does not have an anode and cathode, and the orientation of the lamp in operation is not critical.

Examples of other patents that disclose inventions relating to the cooling of lamps are U.S. Pat. Nos. 5,091,835 (Malek, et al.) and 5,458,505 (Prager).

SUMMARY OF THE INVENTION

The present inventors have recognized that, in an air-cooled arc lamp, while sufficient air flow must be provided to remove heat generated by the lamp, the nature of the air flow over the bulb of the lamp also is important and can affect the performance of the lamp. If the air flow is too great, gas (xenon) turbulence can be created within the bulb itself, causing arc instability. In the case of a projection lamp, this instability can be seen as an annoying flicker on the projection screen. It has been found that the air flow can also contribute to arc instability and flicker if it is non-uniform over the surface of the lamp bulb.

Where the lamp is oriented vertically (usually anode upwards) it has been found that the arc has a tendency to wander at high frequencies, which is especially noticeable as flicker on the projection screen. For this reason, it has been recognized as critical to precisely control the air flow over the lamp.

Accordingly, the present invention is aimed at addressing these problems both as they relate to arc lamps for motion picture projectors, and in arc lamps generally.

In one aspect of the invention, there is provided a method of cooling an arc lamp having coaxial anode and cathode end portions and a glass envelope that includes a bulb between said end portions. The method involves supporting one of the end portions of the lamp in a lamphouse by means of a support that includes a shroud for that end portion of the lamp. The shroud provides an annular air space around the end portion of the lamp, and has an inlet for cooling air and an annular air outlet that is directed towards the bulb of the envelope. Cooling air is caused to flow through the shroud from the shroud inlet to the shroud outlet. Air leaving the outlet flows over the bulb as an annular airstream, cooling the lamp.

The invention also provides an arc lamp assembly that includes a lamp of the form referred to previously and a lamphouse including a light collector and an opening through which light reflected from the lamp by the collector leaves the lamphouse. The lamphouse has an inlet and an outlet for cooling air, and a fan is provided for causing air flow between the inlet and the outlet. The assembly includes lamp supports for the respective end portions of the lamp for positioning the lamp appropriately with respect to the collector. One of the lamp supports includes a shroud for the relevant end portion of the lamp, that provides an annular air space around that end portion of the lamp. The shroud has an inlet for cooling air and an annular air outlet that is directed towards the bulb of the lamp envelope. The cooling air inlet to the lamphouse communicates with the air inlet to the shroud and the cooling air outlet from the lamphouse is located remote from the shroud so that cooling air flows through the shroud in use and leaves the shroud outlet as an annular airstream that flows over the bulb for cooling the lamp.

As indicated previously, the invention is based on the recognition that precise control of cooling air flow over the surface of the lamp is critical to arc stability. The annular air gap between shroud and the end portion of the lamp (usually the anode end) creates a "sheet" of laminar air flow which tends to "adhere" to the surface of the bulb, thereby providing precise cooling. In practice, it has been found that only one cooling fan is necessary for a projection lamphouse and the that air flow can be precisely controlled to provide adequate cooling while avoiding excessive air flow (which could lead to unwanted arc movement).

Preferably, the shroud itself is carried by a support arm that extends inwardly from a wall of the lamphouse. The arm is hollow and communicates with the air inlet to the shroud at one end, and with the air inlet to the lamphouse at its opposite end. The cooling air then flows along the arm and into the shroud. The shroud preferably is positioned asymmetrically with respect to the end of the lamp so that the gap between the shroud and the lamp varies from a maximum adjacent the air inlet to a minimum at the opposite side of the end of the lamp. This offset addresses the tendency of air to move faster near the inlet. The wider gap reduces the air speed while the narrower gap at the opposite side increases the speed of the air. Overall, the result is a more uniform air flow around the entire circumference of the lamp.

BRIEF DESCRIPTION OF DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Figure 1:
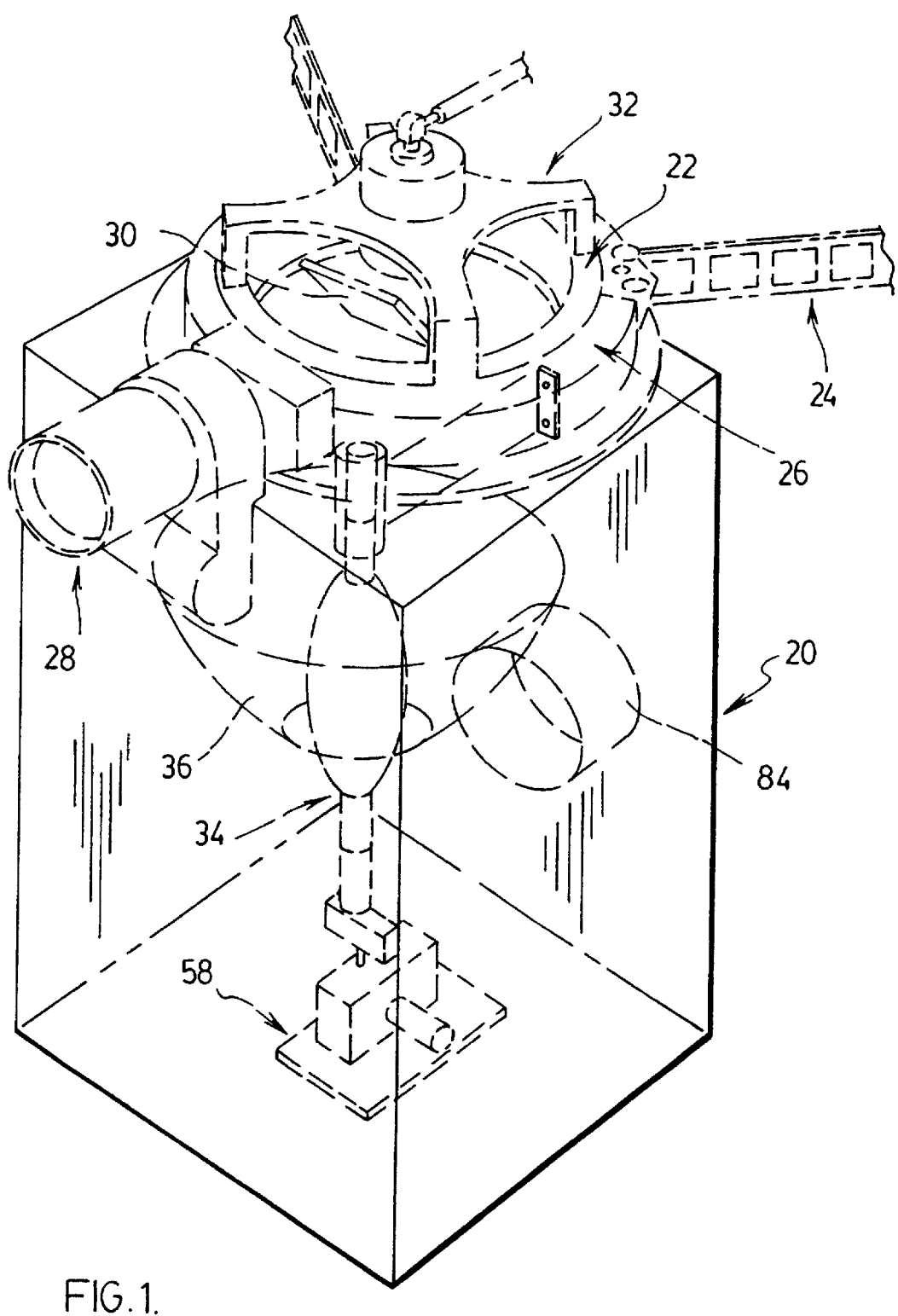
FIG. 1 is a diagrammatic perspective view of a motion picture projector having an arc lamp assembly of the form provided by the invention.

FIG. 1 shows generally a motion picture projector of the form disclosed in the '750 U.S. patent (Gibbon et al.) referred to previously. Reference may be made to the disclosure of that patent for details of the projector mechanism. For present purposes, it is sufficient to note that the projector is of the so-called "rolling loop" type. Reference numeral 20 denotes a lamphouse that is located below a rotor 22 of the projector. Film transported through the projector is indicated at 24 and passes around a portion of the surface of the rotor 22 inwardly of a stator 26. A projection lens assembly is indicated at 28. Light from the lamphouse 20 is directed upwardly and reflected forwardly by a mirror 30, through the film 24 and then through the projection lens 28. Reference numeral 32 denotes a "spider" that rotationally supports the rotor 22 from above.

Figure 2:
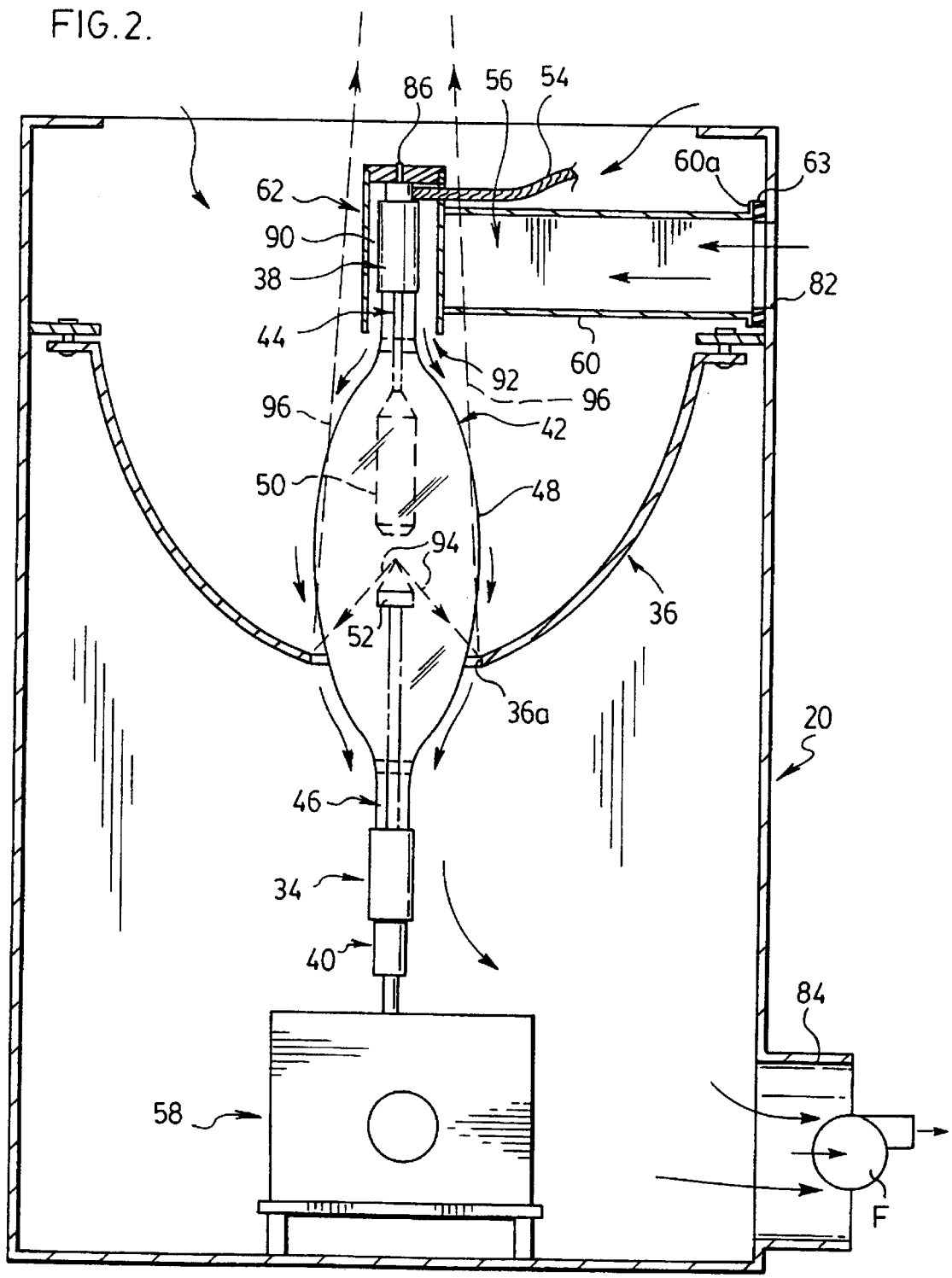
FIG. 2 is a vertical sectional view through the lamphouse of the projector shown in FIG. 1.

Lamphouse 20 is essentially a rectangular box or enclosure within which is supported a projection lamp 34 and a light collector 36. As best seen in FIG. 2, lamp 34 has an anode end portion 38 and a cathode end portion 40 and the two portions are coaxial with one another. A quartz glass envelope 42 encloses respective anode and cathode assemblies 44 and 46 and includes a bulb 48 between the ends. The bulb houses the actual anode and cathode electrodes 50, 52 respectively between which the arc of the lamp is struck. An inert gas (typically xenon) is maintained under high pressure within the glass envelope and the anode and cathode assemblies 44, 46 respectively are provided with pressure seals (not shown). A power supply cable to the anode is denoted 54.

The lamp is of conventional construction.

The lamp 34 is held and positioned with respect to the collector 36 by an anode support 56 and a cathode support 58.

The cathode support 58 is illustrated diagrammatically in FIG. 1 and is essentially conventional. The support provides for adjustability of the cathode end of the lamp in so-called "X", "Y" and "Z" directions that are mutually at right angles. In other words, the position of the lamp can be adjusted by moving the cathode end up and down or laterally in two directions at right angles to one another. As can be seen, the lamp 34 in fact extends through an opening 36a at the bottom of the collector so that the cathode end of the bulb is outside the collector. The cathode support 58 is adjusted so that the arc that is struck between the anode and cathode electrodes 50, 52 is precisely positioned with respect to the focus of the collector to provide appropriate illumination on the screen.

Figure 3:
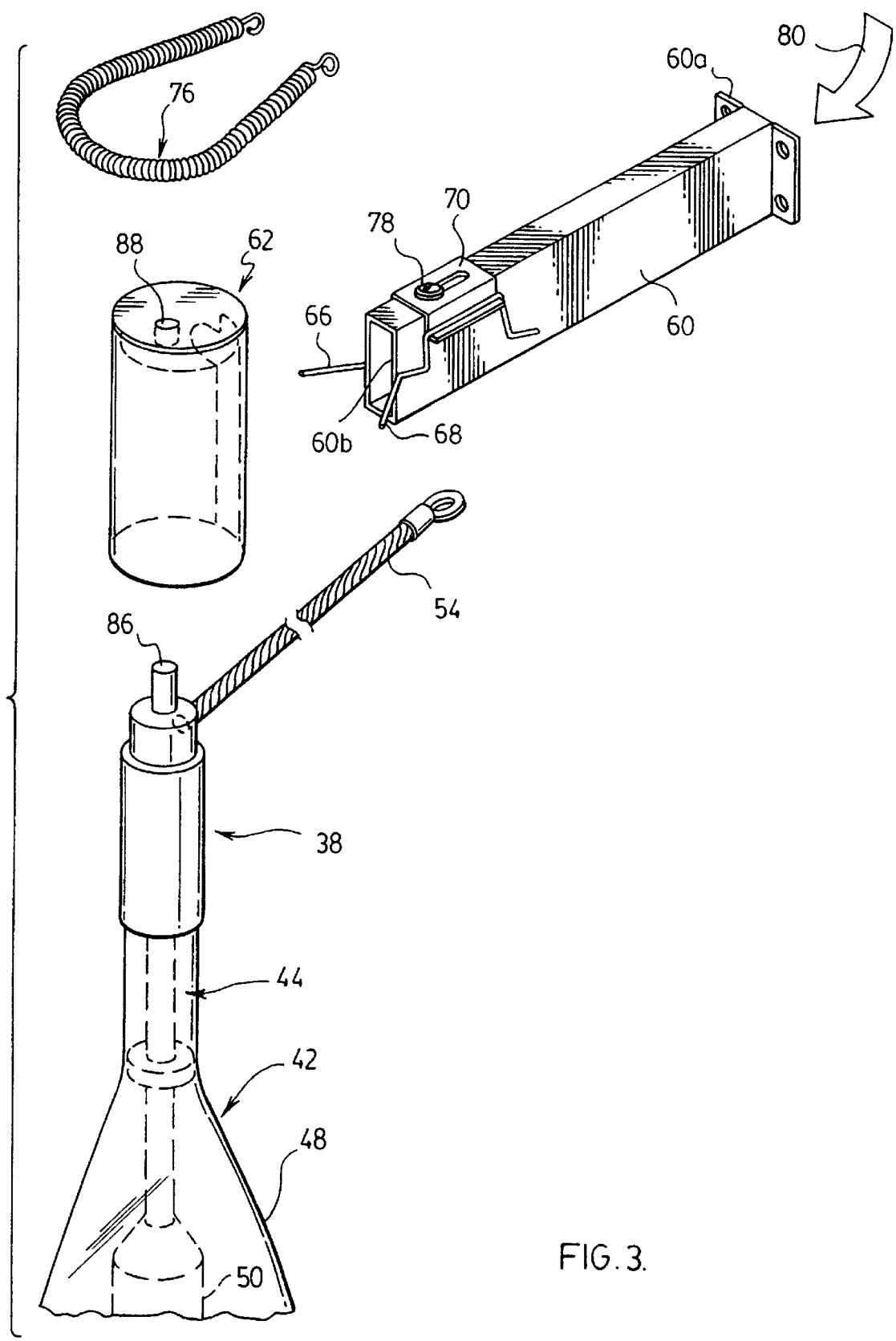
FIG. 3 is an exploded perspective view of the anode end of the lamp, support arm and shroud shown in FIG. 2; and, FIG. 4 is an enlarged perspective view from the right in FIG. 3.
Figure 4:
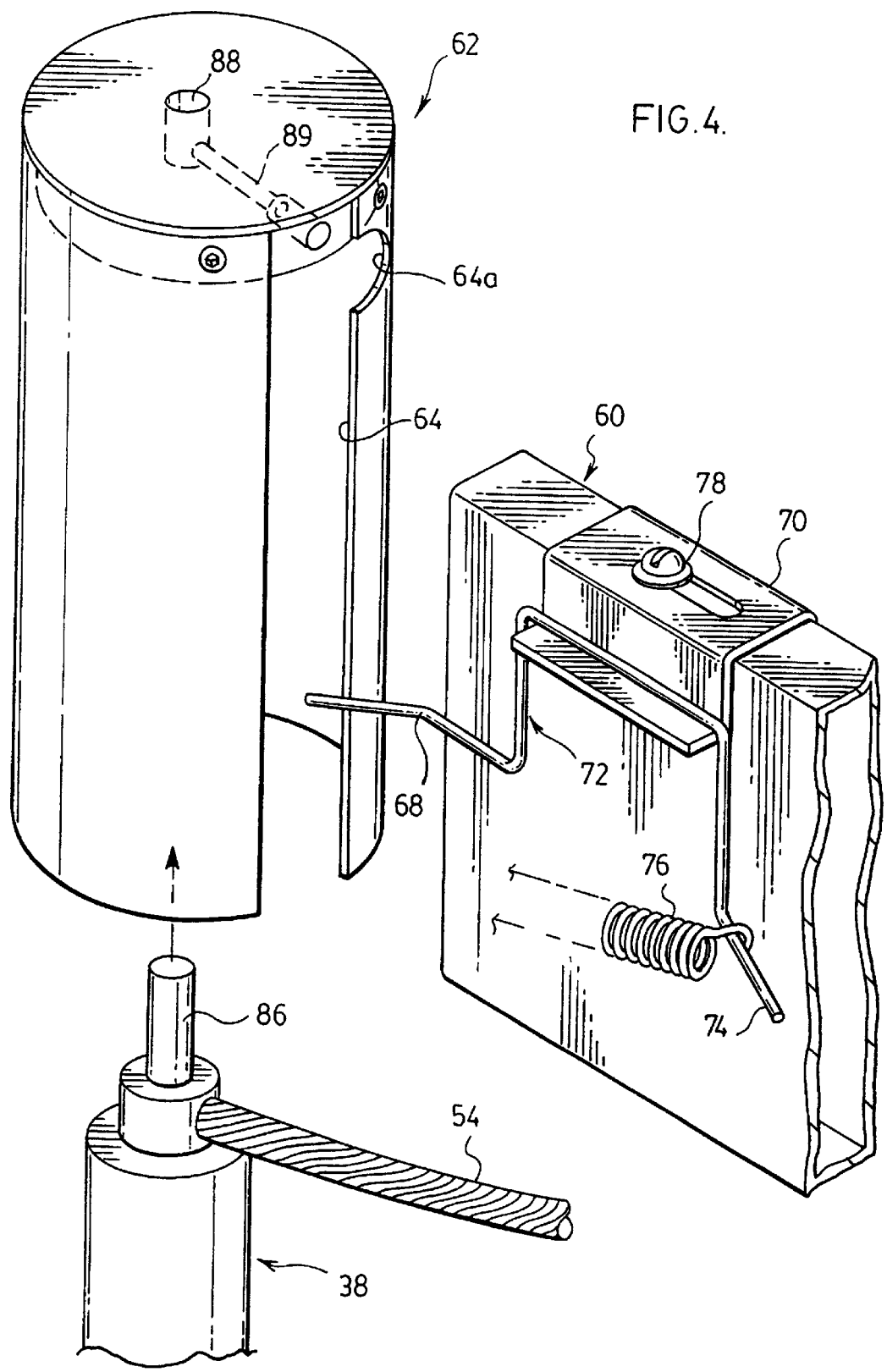

The anode end of the bulb is essentially non-adjustable. As best seen in FIGS. 3 and 4, the anode support 56 for the lamp includes a hollow arm 60 that extends inwardly from the wall of the lamphouse 20, and a cylindrical shroud 62 that fits over the anode end of the lamp as shown in FIG. 2.

Arm 60 is a hollow box-section metal fabrication having flanges 60a at its outer end by which the arm is bolted to the wall of the lamphouse through an insulating block 63. The opposite end of arm 60 terminates in a rectangular end edge 60b that abuts against the external surface of shroud 62 in the assembled lamphouse, as best shown in FIG. 2. An axial slot 64 in the sidewall of shroud 62 aligns with the open end of arm 60. A notch 64a at the top of slot 64 accommodates the anode cable 56.

The shroud 62 and arm 60 are positioned with respect to one another by a pair of wire "fingers" 68 that are arranged in a generally V-shape configuration (see FIG. 3) for embracing the shroud. The two fingers in fact form parts of respective wire formations that are carried by a bracket 70 on support arm 60. The formation that includes finger 68 is denoted 72 in FIG. 4 and includes a rearwardly directed finger 74 that forms an attachment point for a tension spring 76. Spring 76 is looped around the shroud 62 (as best seen in FIG. 3) and hooked onto the companion to finger 74 at the opposite side of arm 60, for securely holding the anode end of the lamp against the arm. Bracket 70 is secured to arm 60 by a screw 78 that extends through a slot in the bracket so that the bracket (and hence the arm two wire formations) can be adjusted with respect to the shroud to ensure accurate positioning of the shroud (and hence the anode end of the lamp) with respect to arm 60.

The slot 64 in shroud 62 comprises a cooling air inlet to the shroud. In FIG. 3, arrow 80 indicates cooling air that enters the lamphouse through an inlet 82 (FIG. 2) and flows along the hollow interior of arm 60 and into shroud 62. FIG. 2 also shows a cooling air outlet 84 at the bottom of the lamphouse (i.e. remote from shroud 62). Outlet 84 communicates with the suction side of a fan (represented at F) that draws cooling air through the lamphouse. This fan also pulls in air from other openings (not shown) to provide cooling for other areas of the lamphouse including the collector 36 and mirrors (not shown) in known fashion.

Reverting to FIGS. 3 and 4, it will be seen that a pin 86 projects upwardly from the anode end of the lamp. A corresponding opening 88 is provided in the top wall of shroud 62 for receiving pin 86 and locating the shroud with respect to the bulb. A set screw indicated generally at 89 can be used to hold pin 86 in opening 88.

It will be seen that opening 88 is in fact offset from the longitudinal axis of the shroud in a direction away from an air inlet slot 64. As best seen in FIG. 2, when the shroud is assembled to the lamp, an annular air space 90 exists between the anode end of the lamp and the shroud. At the bottom end of the shroud, the air space provides an annular air outlet 92 from the shroud (slot 64 is the air inlet).

As a result of the offset of opening 88 (FIGS. 3 and 4) in the shroud, the width of the air space varies between a maximum adjacent air inlet 64, to a minimum at the opposite side of the shroud, as can be clearly seen in FIG. 2. This offset addresses the tendency of air to move faster near the air inlet slot. The wider space near slot 64 reduces the speed of the air entering the shroud while the narrower space at the opposite side of the shroud increases the speed of the air. The result is a more uniform air flow around the entire circumference of the anode and consequently a more uniform flow of air leaving the annular air outlet 92.

As best seen in FIG. 2, the annular air outlet 92 is directed towards the bulb 48. It has been found that the air that leaves outlet 92 flows as an annular, laminar airstream over the bulb 48. This air flow is indicated by the arrows that appear in FIG. 2. The result is a "sheet" of laminar air flow which tends to "adhere" to the surface of the bulb, thereby providing a uniform and stable cooling effect.

The fact that the air outlet opening 84 from lamphouse 20 is positioned at the bottom of the lamphouse and remote from shroud 62 ensures that the air leaving shroud outlet 92 tends to be drawn downwardly around the lamp for maintaining cooling over substantially the entire length of the lamp (though the anode end is the most critical).

The cooling air not only serves to assure arc stability but also cools the seals of the anode and cathode assemblies, for promoting lamp life.

It should be noted that, while providing the advantages outlined above, the anode shroud 62 is sized to avoid casting a shadow or otherwise degrading the light that is reflected by the collector 36. Thus, the shroud is located within the shadow that is already produced by the cathode 52 of the lamp when the arc is struck. In FIG. 2, the lines denoted 94 indicate rays that represent the normal shadow cast by the cathode as light from the arc is reflected at the edge of the collector opening 36a. Those rays are reflected along the lines indicated at 96 and converge outside the lamphouse 20. It will be seen that the shroud 62 falls within that shadow and does not affect the convergence of rays 96.

It should also be noted that the preceding description relates to a particular preferred embodiment of the invention and that many modifications are possible. For example, while the invention has been illustrated in the context of a vertically oriented arc lamp, the invention can also be used with an arc lamp that is oriented horizontally. Similarly, the shroud can be used on either or both ends of the lamp, though normally the anode end is the hottest and therefore requires the most cooling.

Offsetting the shroud with respect to the lamp to give an annular air gap of varying width, while preferred may not be essential in all applications. Another possibility would be to provide for adjustability of the offset. For example, the pin 86 (FIGS. 3 and 4) could be received in a slot that would replace opening 88, and a pair of oppositely acting set screws could be provided to adjust the location of the pin along the slot.

In the illustrated embodiment, air is directed to the shroud through the arm 60 that supports the anode end of the lamp. In an alternative embodiment, the air could be delivered to the shroud other than through the arm, e.g. through a separate conduit.

It should also be noted that, while the invention has been described in the context of xenon arc lamps for motion picture projectors, the invention may be applied to arc lamps for other purposes and, possibly, to arc lamps that have an atmosphere of an inner gas other than xenon.

We claim:

1. A method of cooling a D.C. arc lamp having an anode end portion, a cathode end portion coaxial with the anode end portion, and a glass envelope that includes a bulb between said end portions:

the method comprising the steps of:
        supporting the lamp in a collector within a lamphouse by means of a support that includes a shroud for one of said end portions of the lamp so that said one end portion and the bulb are within the collector and the lamp extends through an annular opening in the collector with the other lamp end portion outside the collector, the shroud providing an annular air space around that end portion of the lamp and having an inlet for cooling air and an annular air outlet that is directed towards the bulb of the envelope; and,
        causing cooling air to flow through the shroud from said inlet to said outlet, air leaving the outlet flowing over the bulb to said annular opening in the collector as an annular airstream for cooling the lamp.

2. A method as claimed in claim 1, wherein said step of causing cooling air to flow through the shroud is performed by causing cooling air from externally of the lamphouse to flow through the lamphouse from an inlet to an outlet, directing incoming cooling air from the inlet to the inlet of the shroud, and positioning the lamphouse air outlet remote from the shroud so as to tend to cause cooling air leaving the shroud outlet to flow over the bulb of the lamp towards the end of the lamp opposite the shroud.

3. A method as claimed in claim 1, wherein the air inlet of the shroud comprises a slot in a sidewall of the shroud, and wherein the method comprises the further step of offsetting the shroud with respect to the lamp so that the annular air space varies from a maximum width adjacent the air inlet slot to a minimum width at a side of the shroud remote from the air inlet slot, for equalizing air flow around the lamp.

4. A D.C. arc lamp assembly comprising:

a lamp having an anode end portion, a cathode end portion coaxial with the anode end portion, and a glass envelope that includes a bulb between said end portions;

a lamphouse including a light collector and having a light outlet opening through which light reflected from the lamp by the collector leaves the lamphouse, and an inlet and an outlet for cooling air;

means for causing cooling air to flow between said inlet and said cooling air outlet of the lamphouse;

lamp supports for respective said end portions of the lamp, said supports positioning the lamp with said bulb and one of said lamp end portions within the collector and the other said end portion of the lamp outside the collector, the bulb extending through an annular opening in the collector;

wherein the said lamp support for said one lamp end portion includes a shroud for said end portion of the lamp, the shroud providing an annular air space around said end portion and having an inlet for cooling air and an annular air outlet that is directed towards said bulb of the envelope;

wherein the cooling air inlet of the lamphouse communicates with said air inlet of the shroud, and the cooling air outlet of the lamphouse is positioned remote from the shroud such that cooling air entering the shroud in use flows as an annular airstream over the bulb and through said annular opening in the collector for cooling the lamp.

5. An arc lamp assembly as claimed in claim 4, wherein said lamp support that includes the shroud comprises an arm that extends inwardly from a sidewall of the lamphouse to the shroud, and means releasably coupling the shroud to the arm, and wherein the shroud is fixed with respect to the relevant said end portion of the lamp.

6. An arc lamp assembly as claimed in claim 4, wherein said air inlet to the shroud comprises a slot in a sidewall of the shroud, and wherein the shroud is offset with respect to the lamp so that the annular space around the end portion of the lamp varies from a maximum width adjacent said air inlet slot to a minimum width at an opposite side of the shroud, for equalizing air flow around the bulb.

7. An arc lamp assembly as claimed in claim 5, wherein said arm and shroud are separate elements and attachment means maintains the shroud in abutment with the arm.

8. An arc lamp assembly as claimed in claim 7, wherein said attachment means comprises a tension spring that encircles the shroud and is coupled at opposite ends to said arm.

9. An arc lamp assembly as claimed in claim 4, comprising a xenon arc lamp positioned vertically in said lamp house with said anode end portion at the top, the lamp extending through an opening in the collector so that light reflected from an edge of said opening by the collector casts a shadow that includes the bulb of the lamp, and wherein the shroud is sized to fit within said shadow.

10. A motion picture projector that includes an arc lamp assembly as claimed in claim 4.

11. A method of cooling an arc lamp having an anode end portion, a cathode end portion coaxial with the anode end portion, and a glass envelope that includes a bulb between said end portions:

the method comprising the steps of:
supporting the lamp in a lamphouse by means of a support that includes a shroud for one of said end portions of the lamp, the shroud providing an annular air space around that end portion of the lamp and having an inlet for cooling air and an annular air outlet that is directed towards the bulb of the envelope; and,
causing cooling air to flow through the shroud from said inlet to said outlet, air leaving the outlet flowing over the bulb as an annular airstream for cooling the lamp;
wherein the air inlet of the shroud comprises a slot in a sidewall of the shroud, and wherein the method comprises the further step of offsetting the shroud with respect to the lamp so that the annular air space varies from a maximum width adjacent the air inlet slot to a minimum width at a side of the shroud remote from the air inlet slot, for equalizing air flow around the lamp.

12. An arc lamp assembly comprising:
a lamp having an anode end portion, a cathode end portion coaxial with the anode end portion, and a glass envelope that includes a bulb between said end portions;
a lamphouse including a light collector and having a light outlet opening through which light reflected from the lamp by the collector leaves the lamphouse, and an inlet and an outlet for cooling air;
means for causing cooling air to flow between said inlet and said cooling air outlet of the lamphouse;
lamp supports for respective said end portions of the lamp for positioning the lamp with respect to the collector;
wherein one of said lamp supports includes a shroud for said end portion of the lamp supported thereby, the shroud providing an annular air space around said end portion and having an inlet for cooling air and an annular air outlet that is directed towards said bulb of the envelope;
wherein the cooling air inlet of the lamphouse communicates with said air inlet of the shroud, and the cooling air outlet of the lamphouse is positioned remote from the shroud, so that cooling air flows through the shroud in use, said annular shroud outlet causing air leaving said shroud outlet to said flow as an annular airstream over the bulb for cooling the lamp;
and wherein said air inlet to the shroud comprises a slot in a sidewall of the shroud, and wherein the shroud is offset with respect to the lamp so that the annular space around the end portion of the lamp varies from a maximum width adjacent said air inlet slot to a minimum width at an opposite side of the shroud, for equalizing air flow around the bulb.

13. An arc lamp assembly comprising:
a lamp having an anode end portion, a cathode end portion coaxial with the anode end portion, and a glass envelope that includes a bulb between said end portions;
a lamphouse including a light collector and having a light outlet opening through which light reflected from the lamp by the collector leaves the lamphouse, and an inlet and an outlet for cooling air;
means for causing cooling air to flow between said inlet and said cooling air outlet of the lamphouse;
lamp supports for respective said end portions of the lamp for positioning the lamp with respect to the collector;
wherein one of said lamp supports includes a shroud for said end portion of the lamp supported thereby, the shroud providing an annular air space around said end portion and having an inlet for cooling air and an annular air outlet that is directed towards said bulb of the envelope;
wherein the cooling air inlet of the lamphouse communicates with said air inlet of the shroud, and the cooling air outlet of the lamphouse is positioned remote from the shroud, so that cooling air flows through the shroud in use, said annular shroud outlet causing air leaving said shroud outlet to said flow as an annular airstream over the bulb for cooling the lamp;
wherein said lamp support that includes the shroud comprises an arm that extends inwardly from a sidewall of the lamphouse to the shroud, and means releasably coupling the shroud to the arm, and wherein the shroud is fixed with respect to the relevant said end portion of the lamp;
and wherein said arm and shroud are separate elements and attachment means maintains the shroud in abutment with the arm.

14. An arc lamp assembly as claimed in claim 13, wherein said attachment means comprises a tension spring that encircles the shroud and is coupled at opposite ends to said arm.

* * * * *